United States Patent
Hsiao et al.

(10) Patent No.: US 9,621,060 B2
(45) Date of Patent: Apr. 11, 2017

(54) SELF-EXCITED POWER CONVERSION CIRCUIT FOR SECONDARY SIDE CONTROL OUTPUT POWER

(71) Applicant: ANWELL SEMICONDUCTOR CORP., Hsin-Chu (TW)

(72) Inventors: Cheng-Po Hsiao, Hsin-Chu (TW);
Chung-Hsin Huang, Hsin-Chu (TW);
Ke-Horng Chen, Hsin-Chu (TW);
Chun-Chieh Kuo, Hsin-Chu (TW);
Shih-Ping Tu, Hsin-Chu (TW);
Shao-Wei Chiu, Hsin-Chu (TW)

(73) Assignee: Anwell Semiconductor Corp., Hsin-Chu (TW)

( * ) Notice: Subject to any disclaimer, the term of this patent is extended or adjusted under 35 U.S.C. 154(b) by 322 days.

(21) Appl. No.: 14/490,926

(22) Filed: Sep. 19, 2014

(65) Prior Publication Data

US 2016/0087535 A1    Mar. 24, 2016

(51) Int. Cl.
*H02J 1/00* (2006.01)
*H02J 3/14* (2006.01)
*H02M 3/338* (2006.01)
*H02M 1/00* (2006.01)

(52) U.S. Cl.
CPC ...... *H02M 3/338* (2013.01); *H02M 2001/007* (2013.01)

(58) Field of Classification Search
CPC .................................................. H02M 3/338
USPC ................................................... 307/31
See application file for complete search history.

(56) References Cited

U.S. PATENT DOCUMENTS

2012/0074866 A1* 3/2012 Zhang ............... H05B 33/0815
                                                      315/291
2012/0187847 A1* 7/2012 Hamamoto ........ H05B 33/0815
                                                      315/125

FOREIGN PATENT DOCUMENTS

TW          M464962         11/2013

* cited by examiner

*Primary Examiner* — Carlos Amaya
(74) *Attorney, Agent, or Firm* — Rosenberg, Klein & Lee

(57) ABSTRACT

A self-excited power conversion circuit for secondary side control output power includes a comparator unit and a transistor installed directly in a secondary side output module, and the comparator unit is electrically coupled to at least one load, and the transistor is electrically coupled between to a conversion module of the circuit and the load. The comparator unit is provided for adjusting the duty cycle of the transistor after detecting the amount of energy outputted from the conversion module to the load from, so as to adjust the amount of energy actually received by the load to achieve a constant power effect.

9 Claims, 8 Drawing Sheets

SELF-EXCITED POWER CONVERSION CIRCUIT FOR SECONDARY SIDE CONTROL OUTPUT POWER

BACKGROUND OF THE INVENTION

1. Field of the Invention

The present invention relates to the technical field of a self-excited power conversion apparatus, and more particularly to a self-excited power conversion circuit for secondary side control output power capable of adjusting the duty cycle of the secondary power output automatically and directly without the need of feeding back to the primary side to achieve a constant output power effect, after a secondary side output voltage is detected by a secondary side control chip installed in a transformer.

2. Description of the Related Art

In general, a driver circuit is installed between a main circuit and a control circuit to drive the operation of an illumination device and convert the mains power to a power with an operating voltage and a current required for outputting a load, and an isolated circuit installed is installed between the main circuit and the load of the illumination device to provide the function of controlling the voltage and current of the output power. For example, a self-excited driver circuit with a half-bridge resonant circuit achieves the effect of converting power directly and features a quick start and an anti-flickering characteristic. On the other hand, such structure is lack of a constant power control mechanism, so that the output power will increase with the input voltage, and thus giving rise of the problem of unable to maintain a stable illumination brightness and the issue of ageing quickly.

To overcome the aforementioned problems, a light emitting diode driver circuit 1 of a single-stage high power factor as disclosed in R.O.C. Utility Model No. TW M464962 and shown in FIG. 1 comprises a power factor correction (PFC) inductor 12 and an energy storage circuit 24, wherein a trigger switch $SW_2$ of a quasi resonant half-bridge circuit 23 is electrically conducted when an energy storage capacitor C2 in the energy storage circuit 24 is charged continuously to a breakdown voltage of a bidirectional trigger diode SIDAC, and the power factor correction inductor 12 formed a charging circuit through the trigger switch $SW_2$, such that after the energy storage capacitor C1 stores energy, the quasi resonant half-bridge circuit 23 is charged. Now, the trigger switch $SW_1$ is electrically conducted, and the power factor correction inductor 12 charges the energy storage capacitor C1 after the charging circuit is formed through the trigger switch $SW_1$, and the trigger switch $SW_1$ is cut off until the oscillation of the quasi resonant half-bridge circuit 23 changes phases, and the trigger switch $SW_2$ is electrically conducted. By operating the trigger switches $SW_1$, $SW_2$ with a zero-voltage switching method, the power factor correction effect can be achieved to prevent the power rises with the sine wave of the input voltage. However, the quasi resonant half-bridge circuit 23 adopting the aforementioned method is installed in a primary side of the light emitting diode driver circuit 1, and thus resulting in an increase of the complexity of the circuit and a disadvantage of causing the overall structure of inductive impedances to have an electromagnetic interference issue easily.

In view of the aforementioned problem, it is a main subject of the present invention to maintain the simple structure of the conventional self-excited driver circuit while controlling the stability of the output power of the control circuit and providing a multi-output function and a dimming function to enhance the adaptability of being installed in various different types of illumination devices.

Therefore, the inventor of the present invention designed and developed a self-excited power conversion circuit in accordance with the present invention to overcome the aforementioned drawbacks and problems of the prior art.

SUMMARY OF THE INVENTION

Therefore, it is a primary objective of the present invention to overcome the problems of the prior art by providing a self-excited power conversion circuit for secondary side control output power, and the self-excited power conversion circuit has a control circuit installed at a secondary side of a power conversion circuit to automatically modulate the duty cycle of the output power to achieve constant output power.

To achieve the aforementioned objective, the present invention provides a self-excited power conversion circuit for secondary side control output power comprising an input module, a self-excited conversion module and an output module, and the output module being electrically coupled to the conversion module and at least one load, and the conversion module being electrically coupled to an external power supply through the input module for converting a power into an input voltage, and the output module outputting the input voltage to the load, characterized in that the output module comprises a comparator unit, a driver unit and a modulator unit, and the modulator unit includes a transistor with a terminal electrically coupled to the conversion module for receiving the input voltage and the other terminal electrically coupled to the load for outputting the input voltage, and the driver unit is electrically coupled to the comparator unit and the modulator unit, and the comparator unit includes a detector electrically coupled to the load for detecting and forming a detected value; the comparator unit compares at least one reference value with the detected value and then outputs a drive signal to the driver unit, so that the driver unit triggers the modulator unit to adjust a duty cycle of the input voltage outputted by the transistor, so as to achieve the effect of controlling the self-excited power conversion circuit to output a constant power directly from a secondary side.

Wherein, the comparator unit includes a first error amplifier, and the driver unit includes a first comparator and a triangular wave oscillator, and the detector is a voltage dividing resistor for detecting the input voltage received by the load to form the detected value; the first error amplifier has a negative input terminal coupled to the voltage dividing resistor for receiving the detected value, a positive input terminal for receiving the reference value, and an output terminal coupled to a negative input terminal of the first comparator, and the first comparator has a positive input terminal coupled to the triangular wave oscillator and an output terminal electrically coupled to a gate of the transistor.

Alternatively, the comparator unit includes a second error amplifier and a third error amplifier, and the driver unit includes a RS flip-flop, and the detector is a voltage dividing resistor for detecting the input voltage received by the load to form the detected value; the third error amplifier has a positive input terminal coupled to the voltage dividing resistor for receiving the detected value, a negative input terminal for receiving the reference value and an output terminal coupled to a reset pin of the RS flip-flop, and the second error amplifier has a positive input terminal for receiving the reference value, a negative input terminal for receiving the detected value, and an output terminal coupled to a setup pin of the RS flip-flop, and the RS flip-flop has an output terminal electrically coupled to a gate of the transistor. The second error amplifier has a positive input terminal for receiving the reference value equal to 2.45 volts, and the third error amplifier has a negative input terminal for receiving the reference value equal to 2.5 volts.

The modulator unit further includes a diode, a switch and a D-type flip-flop, and the transistor has a source electrically coupled to an output terminal of the conversion module through the diode, and a gate coupled to a terminal of the switch, and a trigger terminal of the switch is coupled to an output terminal of the D-type flip-flop, and an input terminal of the D-type flip-flop is coupled to an output terminal of the first comparator, or an output terminal of the RS flip-flop.

In an implementation mode, the load comes with a plural using mode and is connected to the output module in parallel, and the detector is comprised of a current controller and a voltage feedback device, and the comparator unit includes a fourth error amplifier, and the driver unit includes a triangular wave oscillator and a second comparator, and the current controller is coupled to the loads and the voltage feedback device, and the voltage feedback device is coupled to a negative input terminal of the fourth error amplifier, and the fourth error amplifier has a positive input terminal set with a reference value and an output terminal coupled to a negative input terminal of the second comparator, and the second comparator has a positive input terminal coupled to the triangular wave oscillator and an output terminal electrically coupled to a gate of the transistor; the voltage feedback device obtains a minimum voltage value of the loads by the current controller to form the detected value, so that the fourth error amplifier outputs the drive signal of a high voltage level when the detected value is analyzed to be smaller than the reference value, so that an operating status of the transistor is adjusted after the second comparator compares the drive signal by using a triangular wave outputted by the triangular wave oscillator, and the greater the difference between the detected value and the reference value, the higher the voltage level of the drive signal, so as to increase the duty cycle of the transistor to increase the total input voltage outputted to the loads. The detector further includes a third comparator and a short circuit protector, and the third comparator has a positive input terminal coupled to the voltage feedback device, a negative input terminal set with a short circuit value, and an output terminal coupled to the short circuit protector; the third comparator drives the short circuit protector to stop the operation of the output module when the third comparator analyzes that the maximum voltage value of the loads fed back by the voltage feedback device is greater than the short circuit value. The modulator unit further includes an over-voltage comparator and an over-voltage resistor, and the over-voltage comparator has a positive input terminal coupled to the over-voltage resistor, a negative input terminal set with a protection value, and an output terminal electrically coupled to a gate of the transistor, and a terminal of the over-voltage resistor is coupled to a drain of the transistor and the loads for receiving and dividing the input voltage outputted by the output module, so that the over-voltage comparator outputs a cutoff signal to out off the operation of the transistor, when a voltage drop at both terminals of the over-voltage resistor is greater than the protection value. The reference value is a voltage value equal to 0.35 volt, and the short circuit value is a voltage value equal to 6.3 volts, and the protection value is a voltage value equal to 1.23 volts.

In summation of the description above, the present invention achieves the effect of controlling the total power output from the secondary side by the built-in transistor to maintain a constant power output and enhance the overall operating efficiency of the circuit. In the meantime, the invention overcomes the problems of the prior art that requires the installation of an additional feedback device for controlling the power factor from the primary side and causes a complicated circuit and a high cost.

DETAILED DESCRIPTION OF THE PREFERRED EMBODIMENTS

The technical content of the present invention will become apparent with the detailed description of preferred embodiments and the illustration of related drawings as follows.

Figure 1:
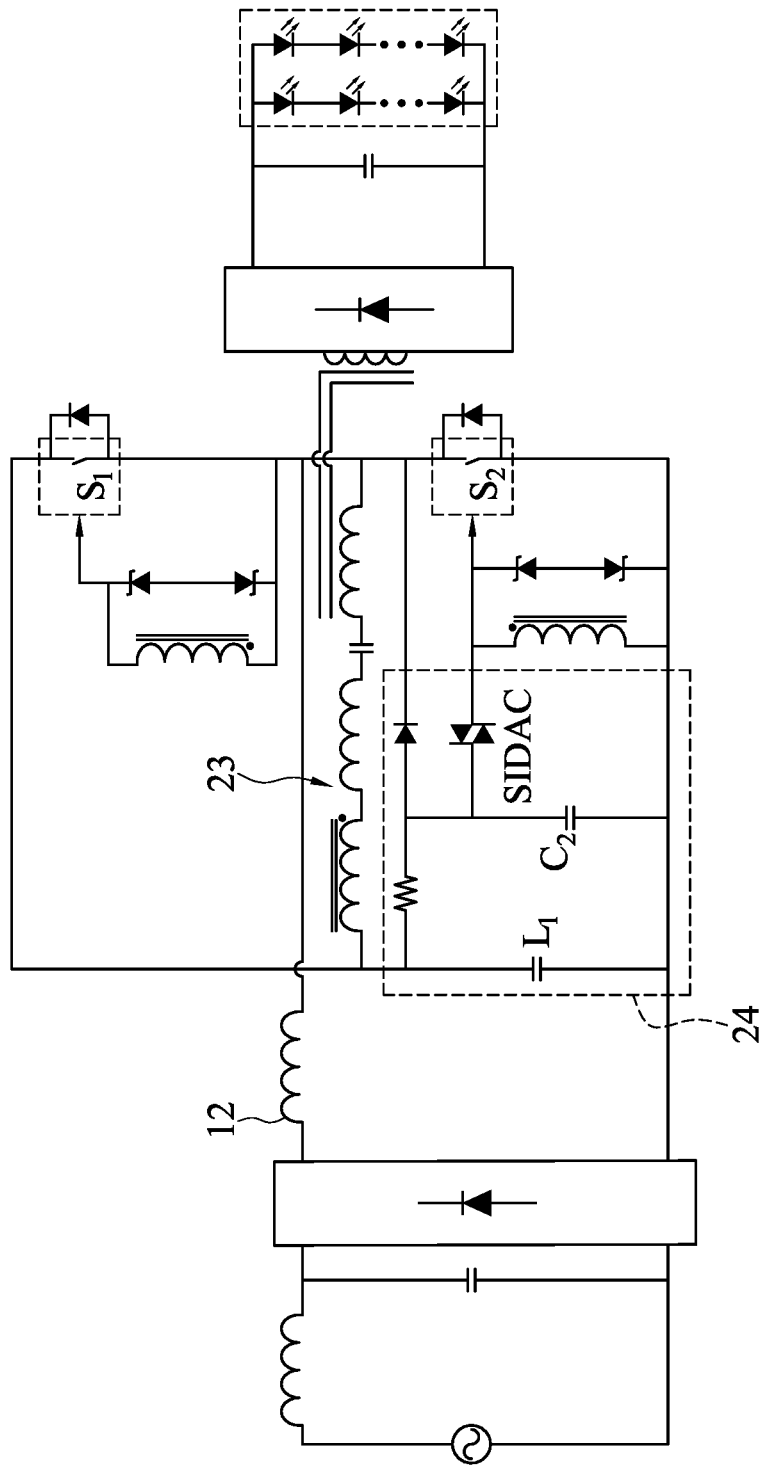
FIG. 1 is a circuit diagram of a conventional self-excited single-stage high power factor LED driver circuit.
Figure 2:
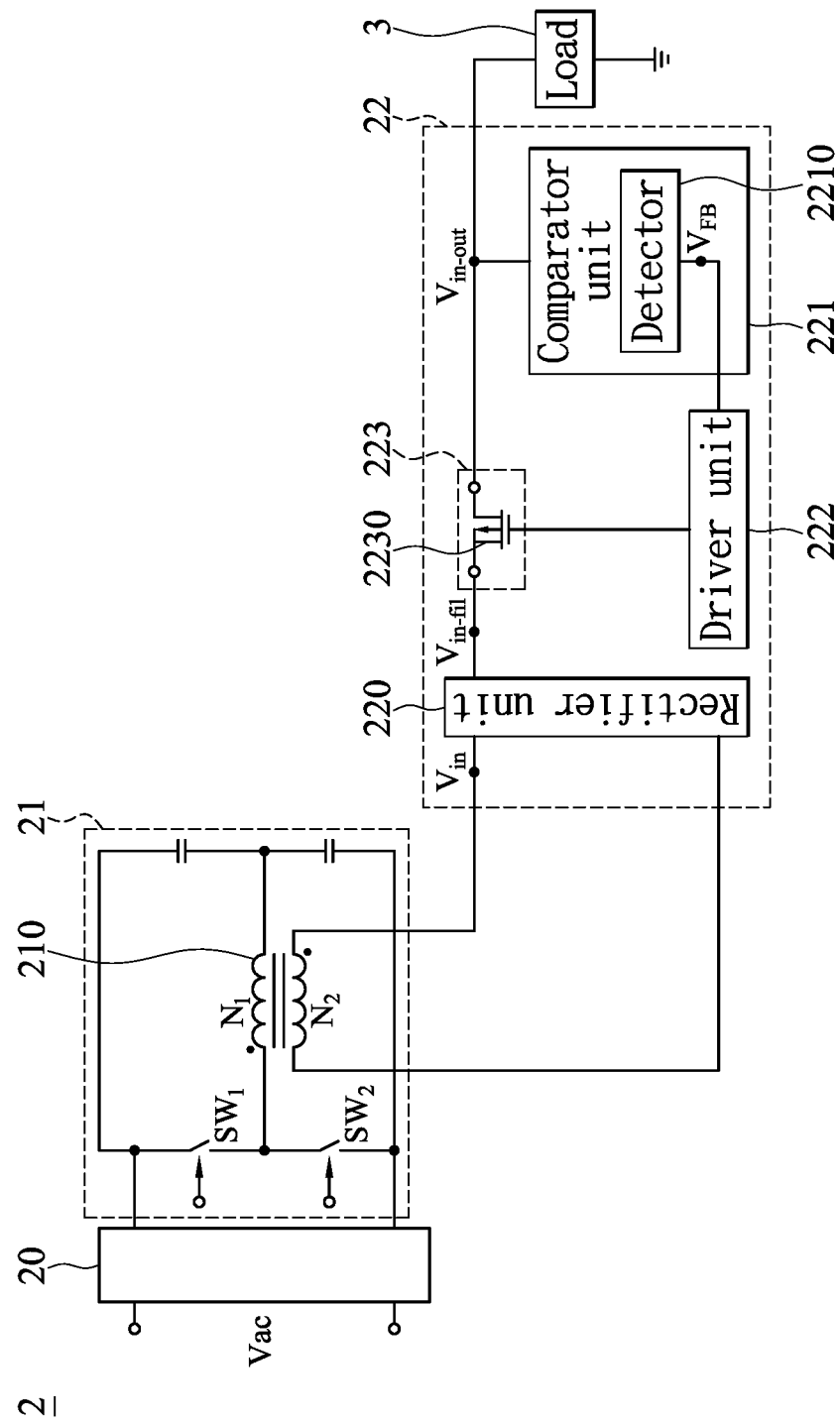
FIG. 2 is a block diagram of a preferred embodiment of the present invention.
Figure 3:
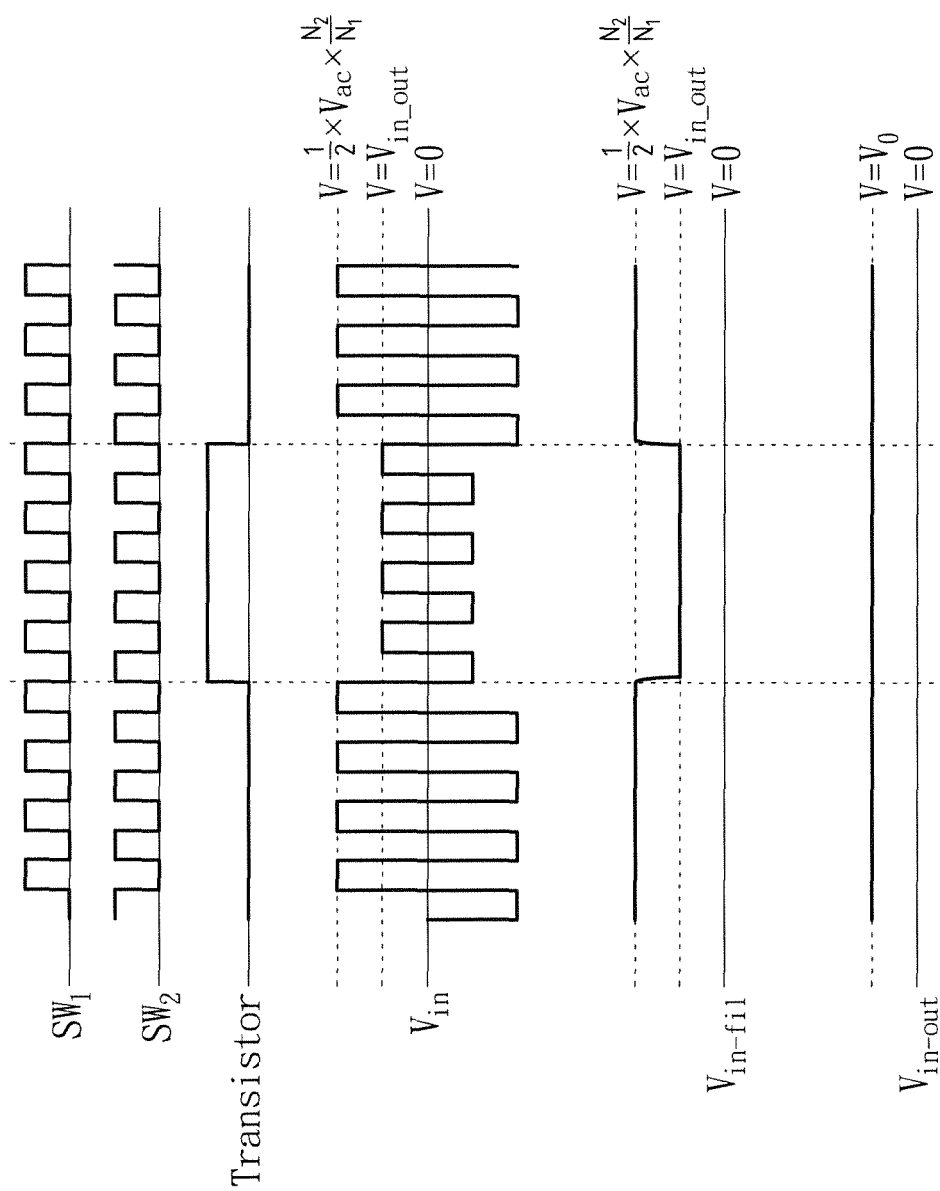
FIG. 3 is a waveform diagram of a preferred embodiment of the present invention.
Figure 4:
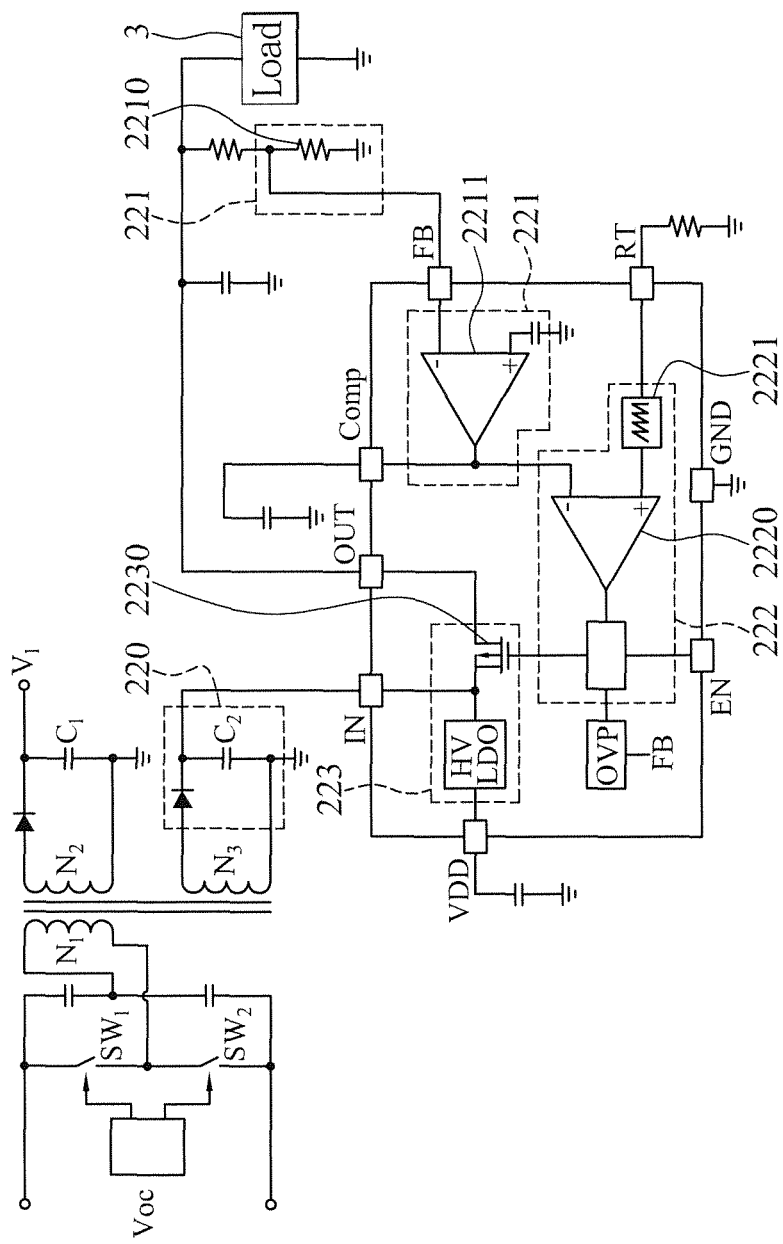
FIG. 4 is a circuit diagram of a first implementation mode of a preferred embodiment of the present invention.

With reference to FIGS. 2 and 3 for a block diagram and a waveform diagram of a preferred embodiment of the present invention respectively, the self-excited power conversion circuit 2 capable of controlling the power output from a secondary side is applicable for an illumination device such as a lamp or a backlight module electrically coupled to at least one load 3, for providing a constant output power to assure the light emitting intensity and stability of the load 3 to improve the overall operating efficiency of the equipment. In other words, the self-excited power conversion circuit 2 can be used as a constant voltage source. The self-excited power conversion circuit 2 comprises an input module 20, a self-excited conversion module 21 and an output module 22, and the output module 22 is electrically coupled to the conversion module 21 and the load 3, and the conversion module 21 includes a transformer 210 and is electrically coupled to an external power supply (not shown in the figure) through the input module 20, and the transformer 210 coverts the power provided by the external power supply into an input voltage (Vin) and then outputs the input voltage (Vin) to the load 3 through the output module 22. Please refer to FIG. 3 for the following description. The output module 22 includes a rectifier unit 220, a comparator unit 221, a driver unit 222 and a modulator unit 223, and the modulator unit 223 includes a transistor 2230 which may be a P-Type Metal-Oxide-Semiconductor Field Effect Transistor (P-MOSFET) having a source electrically coupled to the conversion module 21 through the rectifier unit 220 for receiving an input voltage (Vin_fil; please refer to FIG. 3) rectified by the rectifier unit 20, a drain electrically coupled to the load 3 for transferring and outputting the input voltage. The driver unit 222 is electrically coupled to the comparator unit 221 and a gate of the transistor 2230, and the comparator unit 221 includes a detector 2210 electrically coupled to the load 3 for detecting the input voltage (Vin_out; please refer to FIG. 3) actually received by the load 3 to form a detected value (VFB). After the comparator unit 221 compares the detected value with at least one reference value (Vref), a drive signal is outputted to the driver unit 222, so that the driver unit 222 triggers the modulator unit 223 to adjust the duty cycle of the transistor 2230 to achieve the effects of controlling the self-excited power conversion circuit 2 to output a constant power from the secondary side and improving the overall power factor (PF). It is worth pointing out that a person having ordinary skill in the art should know that when the transistor 2230 is off, the input voltage (Vin_fil) received by the drain of the transistor 2230 is a constant number related to the initial input voltage (Vin) and the turn number of the transformer 210; therefore, it is equivalent to the source of the transistor 2230 being connected with a voltage source. Furthermore, when the transistor 2230 is conducting, the input voltage (Vin_fil) received by the source of the transistor 2230 is equal to the input voltage (Vin_out) received by the load 3; as a result, the source of the transistor 2230 is equivalent to being connected to a current source. In this preferred embodiment, the output module 22 of the self-excited power conversion circuit 2 may have a plurality of using modes, and the comparator unit 221, the driver unit 222 and the modulator unit 223 can be integrated circuits in a control chip, but the detector 2210 in the comparator unit 221 is still a voltage dividing resistor installed outside the control chip. In FIG. 4, the comparator unit 221 has a first error amplifier 2211 installed in the control chip, and the driver unit 222 includes a first comparator 2220 and a triangular wave oscillator 2221, and the first error amplifier 2211 has a negative input terminal coupled to the voltage dividing resistor for receiving the detected value, a positive input terminal for receiving the reference value, and an output terminal coupled to a negative input terminal of the first comparator 2220, and the first comparator 2220 has a positive input terminal coupled to the triangular wave oscillator 2221 and an output terminal electrically coupled to a gate of the transistor 2230 through a buffer, a signal amplifier or an initiator. If the detected value greater than the reference value, the first error amplifier 2211 will output a drive signal to the first comparator 2220 to drop the voltage level, so that when the first comparator 2220 further compares a triangular wave generated by the triangular wave oscillator 2221 with the drive signal, the conduction time of the transistor 2230 will drop to decrease the total output of the input voltage. In other words, the control chip form an adjusting mechanism for switching the operating status of the transistor 2230 to a constant frequency through the drive signal with respect to the voltage value of the triangular wave. Therefore, the total input voltage received by the load 3 is maintained constant and will not change with the rise of the sine wave of the power supplied by the external power supply, so as to achieve the effect of improving the overall PF value.

Figure 5:
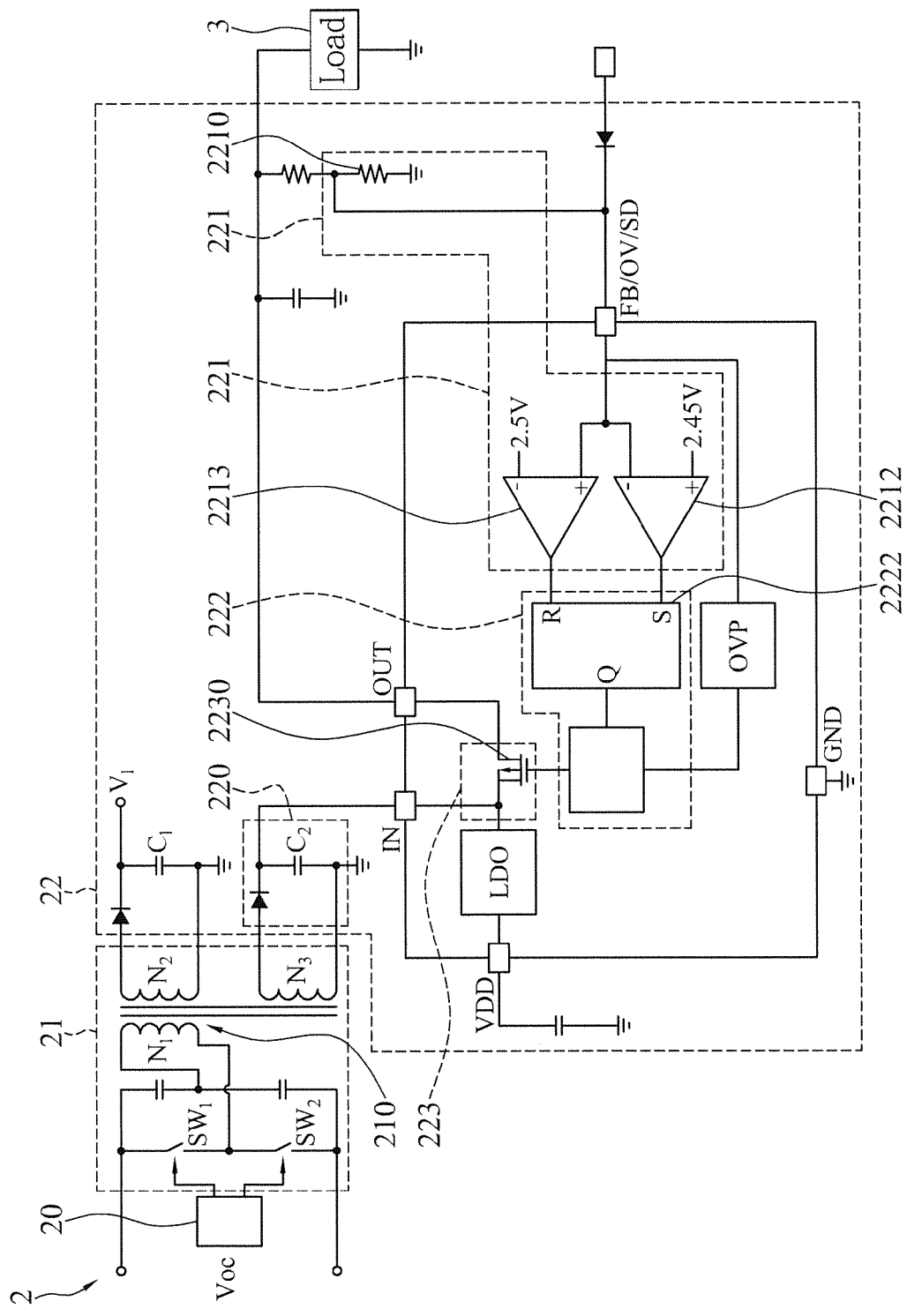
FIG. 5 is a circuit diagram of a second implementation mode of a preferred embodiment of the present invention.

In FIG. 5, the comparator unit 221 includes a second error amplifier 2212 and a third error amplifier 2213, and the driver unit 222 includes a RS flip-flop 2222. The third error amplifier 2213 has a positive input terminal coupled to the voltage dividing resistor for receiving the detected value, a negative input terminal for receiving the reference value equal to 2.5V, and an output terminal coupled to a reset pin of the RS flip-flop 2222, and the second error amplifier 2212 has a positive input terminal for receiving the reference value equal to 2.45V, a negative input terminal for receiving the detected value, and an output terminal coupled to a setup pin of the RS flip-flop 2222, and an output terminal of the RS flip-flop 2222 is electrically coupled to a gate of the transistor 2230. Therefore, the reference values are limited to 2.45V and 2.5V to form a constant ripple, such that the control chip can switch the operating status of the transistor 2230 based on the ripple constant and maintain a constant total input voltage received by the load 3.

Figure 6:
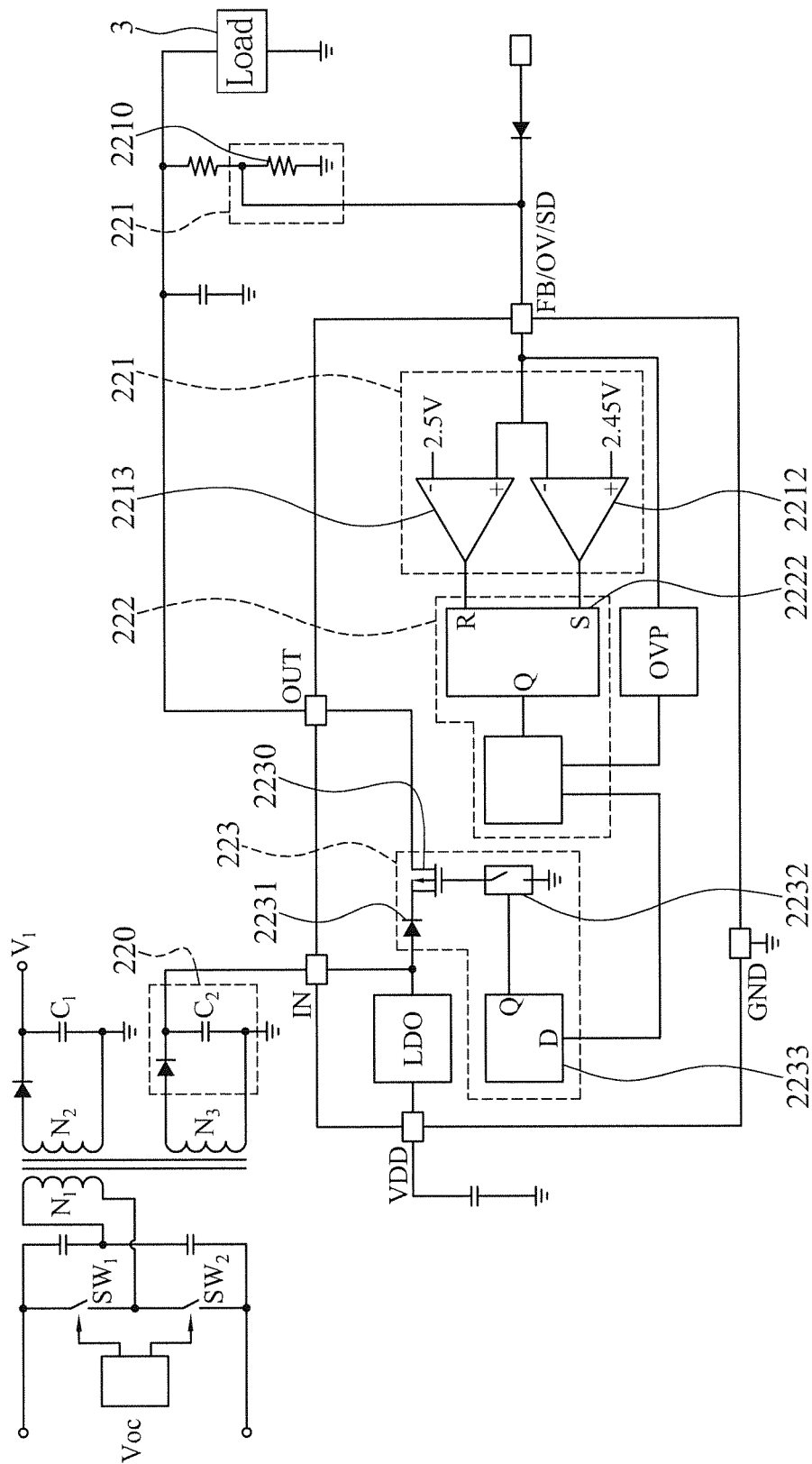
FIG. 6 is a circuit diagram of a third implementation mode of a preferred embodiment of the present invention.

In addition, the modulator unit 223 as shown in FIG. 6 includes a diode 2231, a switch 2232 and a D-type flip-flop 2233, and the transistor 2230 has a source electrically coupled to an output terminal of the conversion module 21 through the diode 2231 and a gate coupled to a terminal of the switch 2232, and a trigger terminal of the switch 2232 is coupled to an output terminal of the D-type flip-flop 2233, and an input terminal of the D-type flip-flop 2233 is coupled to an output terminal of the first comparator 2220 or an output terminal of the RS flip-flop 2222. It is noteworthy that coils with different numbers of windings may be added at the secondary side of the transformer 210 to increase the quantity of output modules 22, and each output module 22 is controlled by the built-in transistor 2230 and serves as a master power supply or a slave power supply for the use as a standby power. Of course, the output modules 22 may be set for the use as a master power or a standby power according to the common switching topology.

Figure 7:
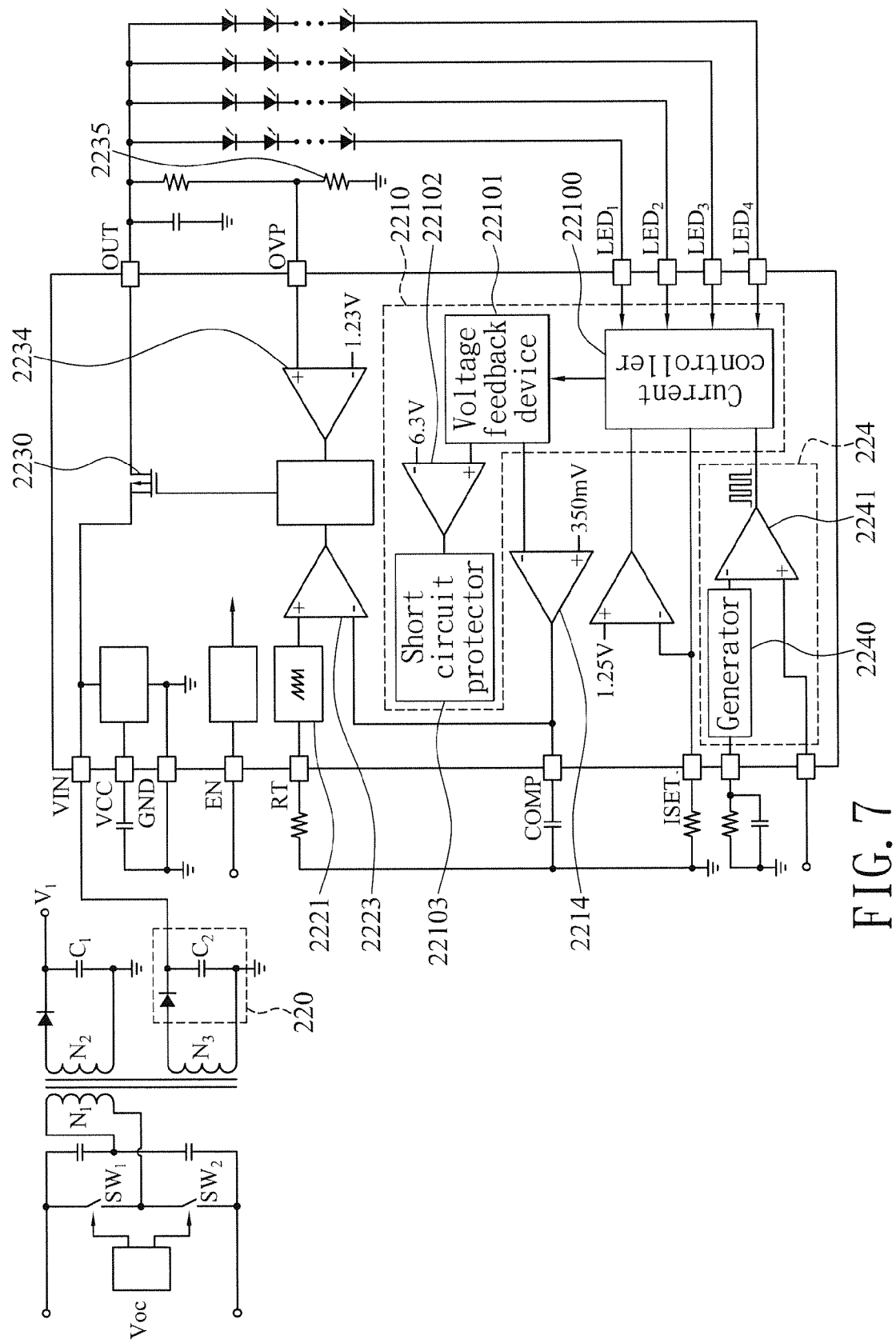
FIG. 7 is a circuit diagram of a fourth implementation mode of a preferred embodiment of the present invention.
Figure 8:
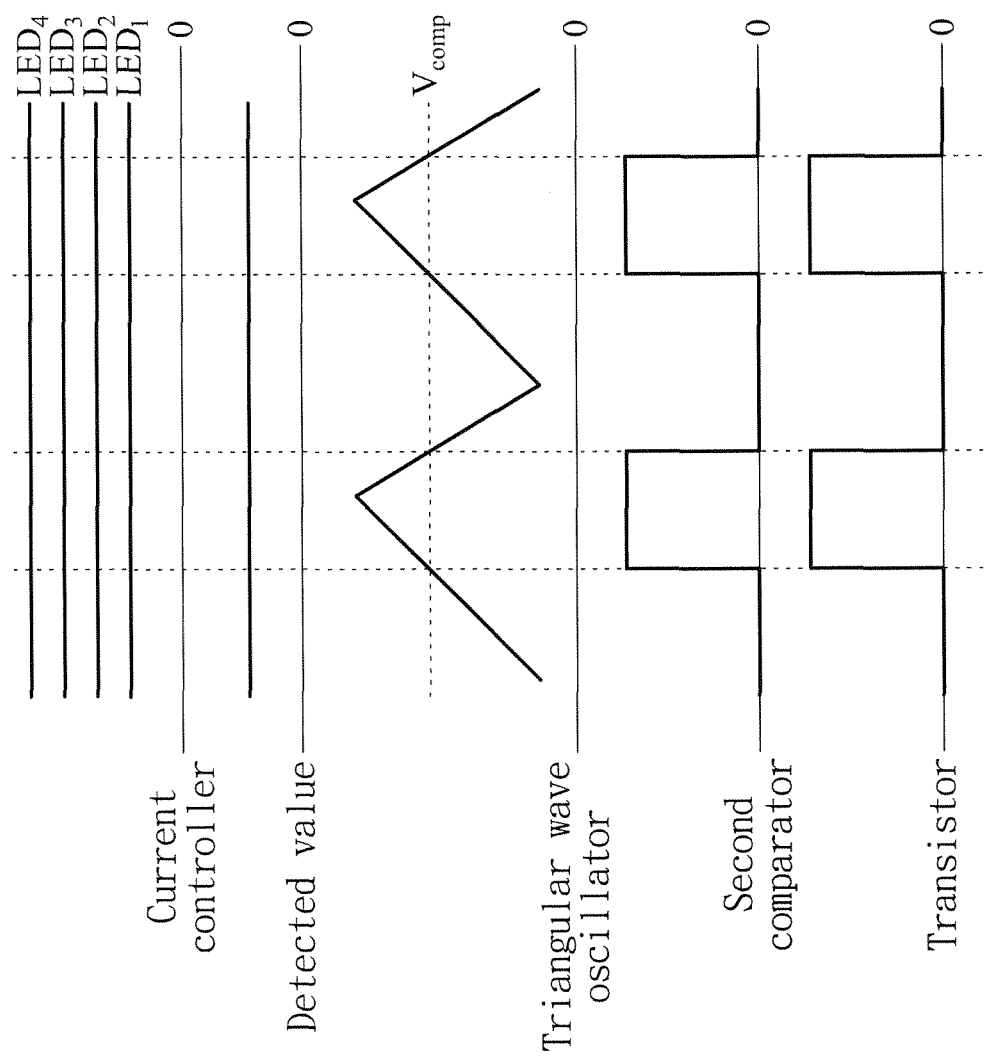
FIG. 8 is a waveform diagram of the fourth implementation mode of a preferred embodiment of the present invention.

On the other hand, if there are a plurality of loads 3 (loads 1~4) as shown in FIGS. 7 and 8 and the loads 3 are connected to the output module 22 in parallel, the detector 2210 may be installed in the control chip and comprised of a current controller 22100 and a voltage feedback device 22101, and the comparator unit 221 includes a fourth error amplifier 2214, and the driver unit 222 includes the triangular wave oscillator 2221 and a second comparator 2223. The current controller 22100 is coupled to the loads 3 and the voltage feedback device 22101, and the voltage feedback device 22101 is coupled to a negative input terminal of the fourth error amplifier 2214, and the fourth error amplifier 2214 has a positive input terminal set with a reference value equal to 0.35V and an output terminal coupled to the negative input terminal of the second comparator 2223, and the second comparator 2223 has a positive input terminal coupled to the triangular wave oscillator 2221 and an output terminal electrically coupled to a gate of the transistor 2230. The voltage feedback device 22101 obtains the minimum voltage value of the loads 3 by the current controller 22100 to form the detected value and feeds the detected value back to the fourth error amplifier 2214. Now, the output terminal of the fourth error amplifier 2214 is connected externally to a capacitor through a COMP pin of the control chip, so that when the detected value is analyzed and determined to be smaller than the reference value, the DC constant voltage forms the drive signal of a high voltage level, and the drive signal is provided to the second comparator 2223 for the second comparator 2223 to compare the drive signal with the triangular wave (please refer to FIG. 8) outputted by the triangular wave oscillator 2221 and then adjust the operating status of the transistor 2230. The smaller the voltage value of the detected value and the greater the difference from the reference value, the higher the voltage level of the drive signal. As a result, the duty cycle of the transistor 2230 is enhanced to increase the total input voltage outputted to the loads 3. In other words, the transistor 2230 may be an N-MOSFET, so that it simply requires an inversion of the positive and negative input pins of the second comparator 2223.

The detector 2210 may include a third comparator 22102 and a short circuit protector 22103, and the third comparator 22102 has a positive input terminal coupled to the voltage feedback device 22101 for receiving the detected value, a negative input terminal set with a short circuit value equal to 6.3V, and an output terminal coupled to the short circuit protector 22103. If the third comparator 22102 analyzes and determines that the maximum voltage value of the loads 3 fed back from the voltage feedback device 22101 is greater than the short circuit value, the third comparator 22102 will drive the short circuit protector 22103 to stop the operation of the output module 22. The modulator unit 223 further includes an over-voltage comparator 2234 and an over-voltage resistor 2235, wherein the over-voltage resistor 2235 is installed outside the control chip. The over-voltage comparator 2234 has a positive input terminal coupled to the over-voltage resistor 2235, a negative input terminal set with a protection value such as 1.23V, and an output terminal electrically coupled to a gate of the transistor 2230, and a terminal of the over-voltage resistor 2235 is coupled to a drain of the transistor 2230 and the loads 3 for receiving and dividing of the input voltage outputted from the output module 22, and then outputting a cutoff signal to cut off the operation of the transistor 2230 when the over-voltage comparator 2234 determines that the voltage drop at both terminals of the over-voltage resistor 2235 is greater than the protection value. The control chip includes a dimmer 224 installed therein, and the dimmer 224 includes a generator 2240 and a fourth comparator 2241, and the fourth comparator 2241 has a negative input terminal coupled to the generator 2240, a positive input terminal for receiving a dimming signal, and an output terminal coupled to the current controller 22100. Please refer to FIG. 8 for the following descriptions. The generator 2240 outputs a triangular wave or a DC voltage level, so that after comparing the dimming signal with the triangular wave or the DC voltage level, the fourth comparator 2241 outputs a pulse value to the current controller 22100 to affect the constant current value of the current passing through the loads 3 to achieve the dimming effect.

What is claimed is:

1. A self-excited power conversion circuit for secondary side control output power, comprising an input module, a self-excited conversion module and an output module, and the output module being electrically coupled to the conversion module and at least one load, and the conversion module being electrically coupled to an external power supply through the input module for converting a power into an input voltage, and the output module outputting the input voltage to the load, characterized in that the output module comprises a comparator unit, a driver unit and a modulator unit, and the modulator unit includes a transistor with a terminal electrically coupled to the conversion module for receiving the input voltage and the other terminal electrically coupled to the load for outputting the input voltage, and the driver unit is electrically coupled to the comparator unit and the modulator unit, and the comparator unit includes a detector electrically coupled to the load for detecting and forming a detected value; the comparator unit compares at least one reference value with the detected value and then outputs a drive signal to the driver unit, so that the driver unit triggers the modulator unit to adjust a duty cycle of the input voltage outputted by the transistor, so as to achieve the effect of controlling the self-excited power conversion circuit to output a constant power directly from a secondary side,
the comparator unit further includes a first error amplifier, and the driver unit includes a first comparator and a triangular wave oscillator, and the detector is a voltage dividing resistor for detecting the input voltage received by the load to form the detected value; the first error amplifier has a negative input terminal coupled to the voltage dividing resistor for receiving the detected value, a positive input terminal for receiving the reference value, and an output terminal coupled to a negative input terminal of the first comparator, and the first comparator has a positive input terminal coupled to the triangular wave oscillator and an output terminal electrically coupled to a gate of the transistor.

2. The self-excited power conversion circuit for secondary side control output power according to claim 1, wherein the modulator unit further includes a diode, a switch and a D-type flip-flop, and the transistor has a source electrically coupled to an output terminal of the conversion module through the diode, and a gate coupled to a terminal of the switch, and a trigger terminal of the switch is coupled to an output terminal of the D-type flip-flop, and an input terminal of the D-type flip-flop is coupled to an output terminal of the first comparator, or an output terminal of the RS flip-flop.

3. A self-excited power conversion circuit for secondary side control output power, comprising an input module, a self-excited conversion module and an output module, and the output module being electrically coupled to the conversion module and at least one load, and the conversion module being electrically coupled to an external power supply through the input module for converting a power into an input voltage, and the output module outputting the input voltage to the load, characterized in that the output module comprises a comparator unit, a driver unit and a modulator unit, and the modulator unit includes a transistor with a terminal electrically coupled to the conversion module for receiving the input voltage and the other terminal electrically coupled to the load for outputting the input voltage, and the driver unit is electrically coupled to the comparator unit and the modulator unit, and the comparator unit includes a detector electrically coupled to the load for detecting and forming a detected value; the comparator unit compares at least one reference value with the detected value and then outputs a drive signal to the driver unit, so that the driver unit triggers the modulator unit to adjust a duty cycle of the input voltage outputted by the transistor, so as to achieve the effect of controlling the self-excited power conversion circuit to output a constant power directly from a secondary side, wherein the comparator unit further includes a second error amplifier and a third error amplifier, and the driver unit includes a RS flip-flop, and the detector is a voltage dividing resistor for detecting the input voltage received by the load to form the detected value; the third error amplifier has a positive input terminal coupled to the voltage dividing resistor for receiving the detected value, a negative input terminal for receiving the reference value and an output terminal coupled to a reset pin of the RS flip-flop, and the second error amplifier has a positive input terminal for receiving the reference value, a negative input terminal for receiving the detected value, and an output terminal coupled to a setup pin of the RS flip-flop, and the RS flip-flop has an output terminal electrically coupled to a gate of the transistor.

4. The self-excited power conversion circuit for secondary side control output power according to claim 3, wherein the second error amplifier has a positive input terminal for receiving the reference value equal to 2.45 volts, and the third error amplifier has a negative input terminal for receiving the reference value equal to 2.5 volts.

5. The self-excited power conversion circuit for secondary side control output power according to claim 3, wherein the modulator unit further includes a diode, a switch and a D-type flip-flop, and the transistor has a source electrically coupled to an output terminal of the conversion module through the diode, and a gate coupled to a terminal of the switch, and a trigger terminal of the switch is coupled to an output terminal of the D-type flip-flop, and an input terminal of the D-type flip-flop is coupled to an output terminal of the first comparator, or an output terminal of the RS flip-flop.

6. A self-excited power conversion circuit for secondary side control output power, comprising an input module, a self-excited conversion module and an output module, and the output module being electrically coupled to the conversion module and at least one load, and the conversion module being electrically coupled to an external power supply through the input module for converting a power into an input voltage, and the output module outputting the input voltage to the load, characterized in that the output module comprises a comparator unit, a driver unit and a modulator unit, and the modulator unit includes a transistor with a terminal electrically coupled to the conversion module for receiving the input voltage and the other terminal electrically coupled to the load for outputting the input voltage, and the driver unit is electrically coupled to the comparator unit and the modulator unit, and the comparator unit includes a detector electrically coupled to the load for detecting and forming a detected value; the comparator unit compares at least one reference value with the detected value and then outputs a drive signal to the driver unit, so that the driver unit triggers the modulator unit to adjust a duty cycle of the input voltage outputted by the transistor, so as to achieve the effect of controlling the self-excited power conversion circuit to output a constant power directly from a secondary side, wherein the load comes with a plural using mode and is connected to the output module in parallel, and the detector is comprised of a current controller and a voltage feedback device, and the comparator unit includes a fourth error amplifier, and the driver unit includes a triangular wave oscillator and a second comparator, and the current controller is coupled to the loads and the voltage feedback device, and the voltage feedback device is coupled to a negative input terminal of the fourth error amplifier, and the fourth error amplifier has a positive input terminal set with a reference value and an output terminal coupled to a negative input terminal of the second comparator, and the second comparator has a positive input terminal coupled to the triangular wave oscillator and an output terminal electrically coupled to a gate of the transistor; the voltage feedback device obtains a minimum voltage value of the loads by the current controller to form the detected value, so that the fourth error amplifier outputs the drive signal of a high voltage level when the detected value is analyzed to be smaller than the reference value, so that an operating status of the transistor is adjusted after the second comparator compares the drive signal by using a triangular wave outputted by the triangular wave oscillator, and the greater the difference between the detected value and the reference value, the higher the voltage level of the drive signal, so as to increase the duty cycle of the transistor to increase the total input voltage outputted to the loads.

7. The self-excited power conversion circuit for secondary side control output power according to claim 6, wherein the detector further includes a third comparator and a short circuit protector, and the third comparator has a positive input terminal coupled to the voltage feedback device, a negative input terminal set with a short circuit value, and an output terminal coupled to the short circuit protector; the third comparator drives the short circuit protector to stop the operation of the output module when the third comparator analyzes that the maximum voltage value of the loads fed back by the voltage feedback device is greater than the short circuit value.

8. The self-excited power conversion circuit for secondary side control output power according to claim 7, wherein the modulator unit further includes an over-voltage comparator and an over-voltage resistor, and the over-voltage comparator has a positive input terminal coupled to the over-voltage resistor, a negative input terminal set with a protection value, and an output terminal electrically coupled to a gate of the transistor, and a terminal of the over-voltage resistor is coupled to a drain of the transistor and the loads for receiving and dividing the input voltage outputted by the output module, so that the over-voltage comparator outputs a cutoff signal to cut off the operation of the transistor, when a voltage drop at both terminals of the over-voltage resistor is greater than the protection value.

9. The self-excited power conversion circuit for secondary side control output power according to claim 8, wherein the reference value is a voltage value equal to 0.35 volt, and the short circuit value is a voltage value equal to 6.3 volts, and the protection value is a voltage value equal to 1.23 volts.

* * * * *